United States Patent
McLeod et al.

(10) Patent No.: US 9,025,702 B2
(45) Date of Patent: May 5, 2015

(54) METHOD AND APPARATUS FOR IMPLEMENTING SLICE-LEVEL ADJUSTMENT

(75) Inventors: Scott McLeod, Los Gatos, CA (US); Nikola Nedovic, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 219 days.

(21) Appl. No.: 13/219,490

(22) Filed: Aug. 26, 2011

(65) Prior Publication Data
US 2013/0051497 A1 Feb. 28, 2013

(51) Int. Cl.
*H04L 25/10* (2006.01)
*H04B 10/69* (2013.01)
*H04L 7/00* (2006.01)
*H04L 7/033* (2006.01)

(52) U.S. Cl.
CPC ............ *H04B 10/695* (2013.01); *H04L 7/0087* (2013.01); *H04L 7/033* (2013.01)

(58) Field of Classification Search
CPC ................. H04L 2025/0349; H04L 25/03057; H04L 25/061; H04L 7/033; H03L 7/0814; H03L 7/091

USPC ................................. 375/317, 316, 340, 346
See application file for complete search history.

(56) References Cited

U.S. PATENT DOCUMENTS

| | | | |
|---|---|---|---|
| 6,437,723 B1 | 8/2002 | Otsuka | |
| 6,657,488 B1 | 12/2003 | King | |
| 8,249,207 B1 * | 8/2012 | Hissen et al. | 375/355 |
| 2004/0120426 A1 * | 6/2004 | Dagdeviren et al. | 375/340 |
| 2005/0123068 A1 * | 6/2005 | Liu et al. | 375/316 |
| 2007/0006054 A1 * | 1/2007 | Fiedler | 714/709 |
| 2008/0049850 A1 * | 2/2008 | Sidiropoulos et al. | 375/257 |

* cited by examiner

*Primary Examiner* — Leila Malek
(74) *Attorney, Agent, or Firm* — Baker Botts L.L.P.

(57) ABSTRACT

In one embodiment, a receiver may receive a signal from a transmitter. The receiver may include a first sampler that may sample the signal when the value of the signal is zero. The receiver may further include a second sampler that may sample the signal halfway between a time when the first sampler samples the signal and the next time when the first sampler samples the signal to produce a set of sampled values. The receiver may be further operable to determine that a sampled value in the set of sampled values is a logic 1 if the sampled value is greater than the value of a reference voltage and that the sampled value is a logic 0 if the sampled value is less than the value of the reference voltage.

21 Claims, 3 Drawing Sheets

METHOD AND APPARATUS FOR IMPLEMENTING SLICE-LEVEL ADJUSTMENT

TECHNICAL FIELD

This disclosure generally relates to optical communications.

BACKGROUND

Optical signaling is an alternative to electrical signaling for high-speed short-reach communication links. A vertical-cavity surface-emitting laser (VCSEL) is typically the light source in short-reach high-speed optical links. The light produced by the VCSEL is coupled to an optical medium (e.g., fiber or waveguide) and sensed at the receiver by, for example, a photodiode (PD).

DESCRIPTION OF THE FIGURES

Figure 1:
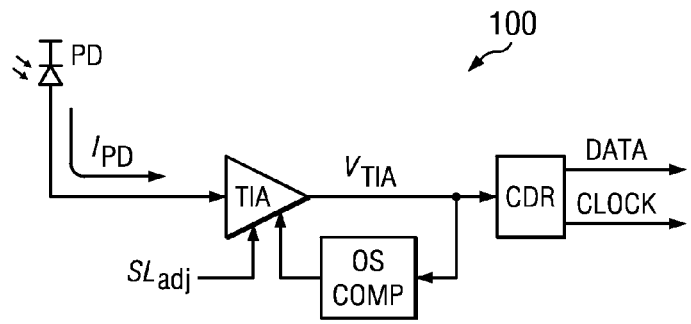
FIG. 1 illustrates an example high-speed optical receiver.

FIG. 1 illustrates an example high-speed optical receiver 100. As provided in FIG. 1, the photodiode (PD) may convert the optical energy incident upon it to a current $I_{PD}$). This current may be amplified and converted to a voltage $V_{TIA}$ by the transimpedance amplifier (TIA) to a level that is suitable for the clock-and-data recovery circuit (CDR) to reliably sample the data and recover the clock that is embedded within the data signal. The photocurrent $I_{PD}$ may be as small as a few tens of microamperes or as large as one or two milliamperes. In the former case, non-idealities in the TIA or noise that may be present on the signal may significantly corrupt the integrity of the signal and impair reliable error-free data detection by the CDR.

In particular embodiments, to increase reliable data detection, two functions may be implemented in high-speed optical receiver 100: offset compensation and slice-level adjustment. The former may cancel offset that may be present in the TIA circuit due to, for example, non-idealities like device and component mismatch. Offset-compensation may be implemented by enclosing the TIA in a feedback loop, as illustrated in FIG. 1. In particular embodiments, receiver 100 may incorporate an additional amplifier after the TIA. In these embodiments, the offset-compensation loop may be applied around this additional amplifier, or both the TIA and the amplifier. Further, in certain embodiments, the offset-compensation mechanism may sense the offset information by decoding the data and edge samples produced by the CDR, instead of directly from the signal at the output of the TIA. Offset compensation may also be performed via application of an external control signal. The other function that may be implemented, slice-level adjustment, allows the signal level at which a particular data bit is determined to be a logic "1" or logic "0" to be adjustable. In particular embodiments, slice-level adjustment may be implemented in optical receiver 100 because the photocurrent $I_{PD}$ may have asymmetrical noise characteristics. As an example, and not by way of limitation, the logic "1" level may be noisier than the logic "0" level.

Figure 2:
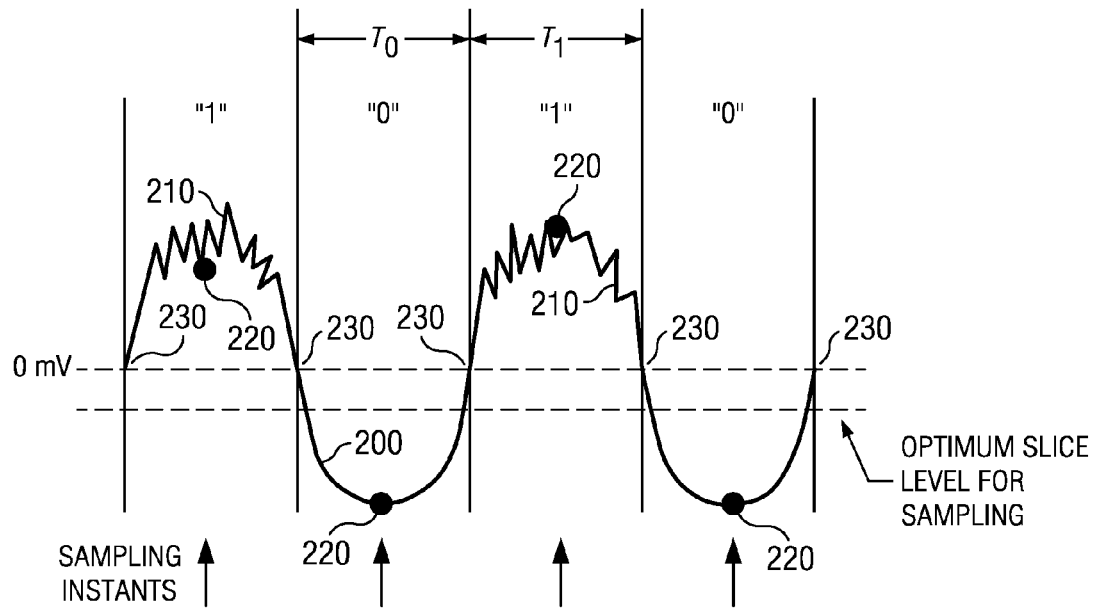
FIG. 2 illustrates an example signal with unequal noise distributions.

FIG. 2 illustrates an example signal 200 with unequal noise distributions. As provided in FIG. 2, dots 220 represent the values of the signal 200 when it is sampled halfway between the signal's 200 zero crossings 230. Due to the noise 210 present on the "1" bits, the sampled "1" values may vary more than the sampled "0" values. For this reason, the optimum slicing level may be below zero. Furthermore, the width of the "1" bits may be equal to the width of the "0" bits (i.e., T1=T0). In other words, there may be no pulse-width distortion (PWD, also known as duty-cycle distortion or DCD) present in the signal 200. When this is the case, the CDR may position its sampling clock halfway between the crossings 230, as shown in FIG. 2, with little to no timing uncertainty.

Figure 3:
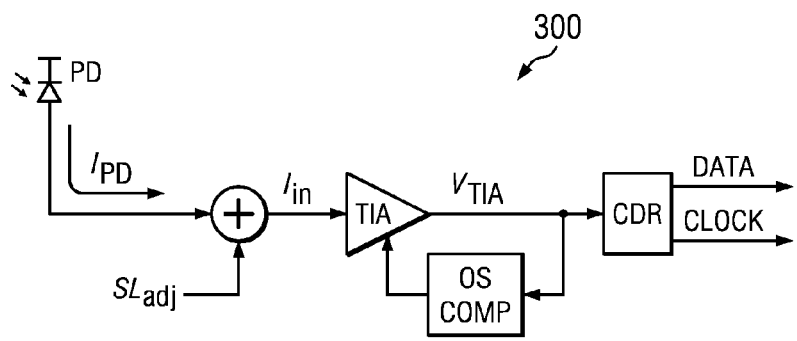
FIG. 3 illustrates an example receiver effecting slice-level adjustment.

FIG. 3 illustrates an example receiver 300 effecting slice-level adjustment. As provided in FIG. 3, slice-level adjustment may be effected by injecting an intentional offset ($SL_{adj}$ of FIG. 3) into the signal 200 prior to its being amplified by the TIA. Doing so may move the slicing level to below halfway between the logic "1" and "0" levels—that is, below zero. Both the offset-compensation adjustment and slice-level adjustment may be applied to the signal 200 continuously—that is, without consideration for when in time the adjustments are applied with respect to the signal's 200 transitions. In other words, slice-level adjustment may be applied to the signal 200 when it is both near its zero crossings and when it is at a near constant level. However, by continuously amplifying the difference between the signal 200 and a variable non-zero slice level, the times of the signal's 200 zero crossings 230 may be corrupted, and thereby cause the CDR to generate more jitter, ultimately degrading the receiver's 300 overall performance.

Figure 4:
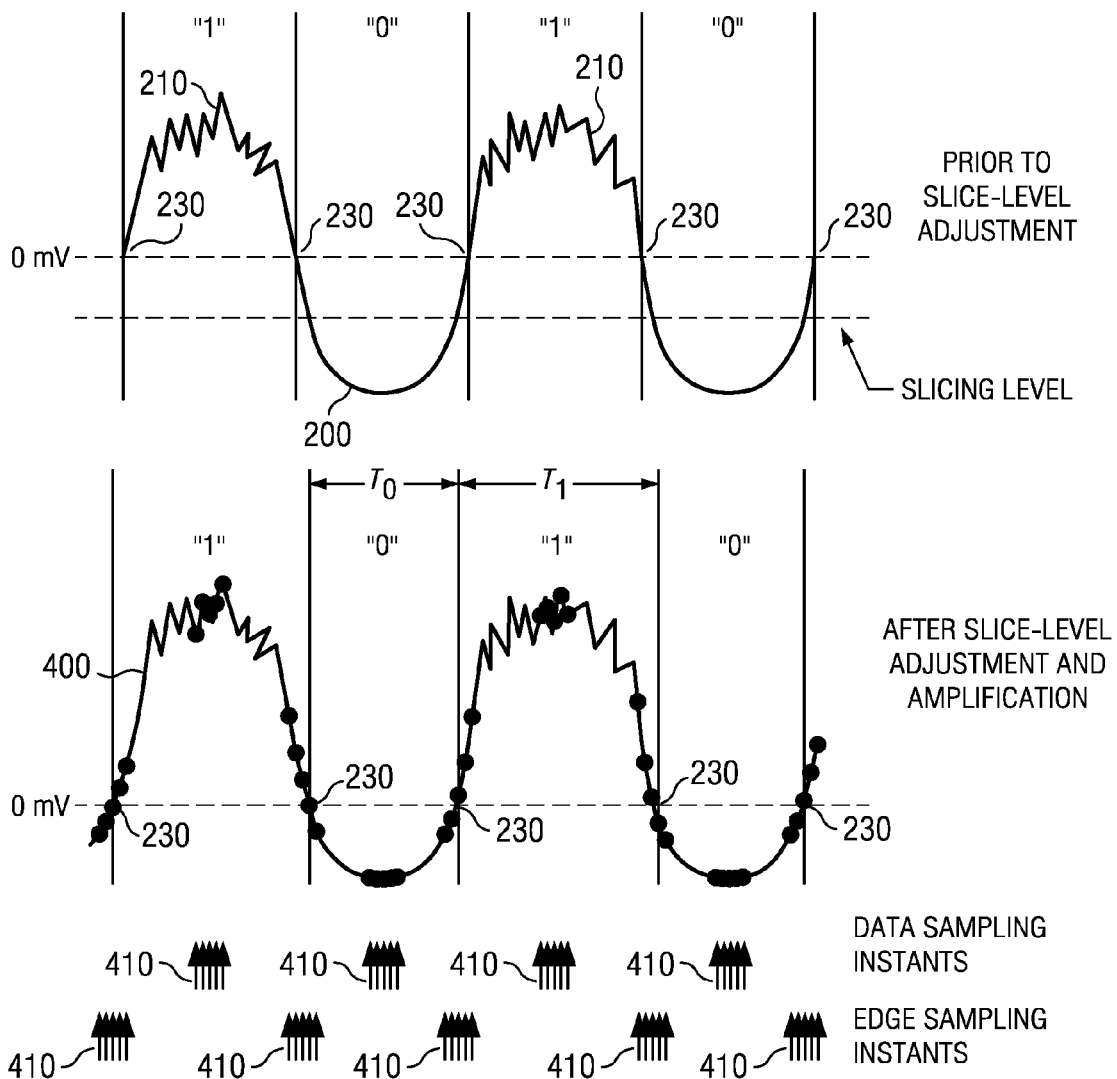
FIG. 4 illustrates an example signal with slice-level adjustment effected by the receiver of FIG. 3.

FIG. 4 illustrates an example signal 200 prior to the application of slice-level adjustment effected by the receiver of FIG. 3, and an example signal 400 after the adjustment is effected. As provided in FIG. 4, after undergoing slice-level adjustment and amplification, the signal 400 may contain PWD (that is, T1 is now not equal to T0), and the CDR's data-sampling and edge-sampling clocks may contain jitter 410. Jitter 410 may be injected into the clocks because, when T1≠T0, the CDR's phase detector may produce a dead zone inside of which no error information may be generated. The width of this dead zone may be equal to the difference between T1 and T0.

Jitter 410 may be generated because the CDR may use the timing information of the signal's 400 zero crossings 230 to determine where to position the CDR's clocks with respect to the crossings 230. The CDR may attempt to position the data-sampling clock at the instant at which it is most optimal to sample the signal 400: halfway between the zero crossings 230, when the signal's 400 amplitude is at or near its maximum. Because the times at which these crossings 230 occur may be corrupted, the slice-adjustment operation may inject timing uncertainty into the input signal 400 of the CDR. This may cause the CDR to less reliably position its clock at the optimal sampling point, and therefore sample the signal 400 at instants away from the optimal. This may lead to larger jitter and thus more bit errors, thereby degrading receiver 300 performance.

Figure 5:
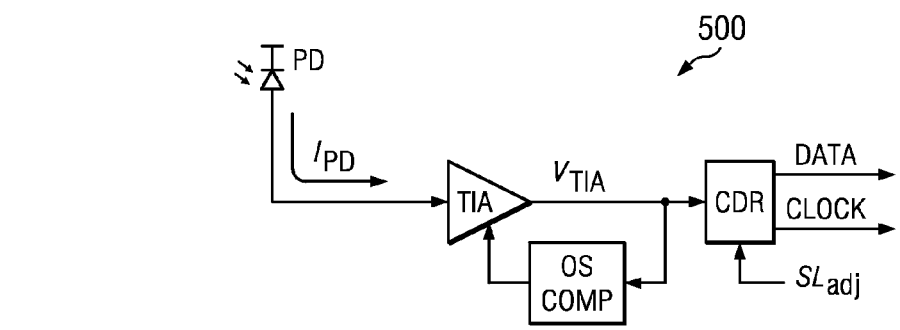
FIG. 5 illustrates an example receiver effecting slice-level adjustment.

FIG. 5 illustrates an example receiver 500 effecting slice-level adjustment. As provided in FIG. 5, the slice-level adjustment may be applied to the decision circuit inside the CDR that samples the data midway between zero crossings 230. In particular embodiments, receiver 500 may apply an adjustment signal when doing so does not affect the timing of the signal's 200 zero crossings 230. In other words, the adjustment may be made when the gain from the adjustment to time is zero. This may be achieved by applying the adjustment at instants midway between zero crossings 230—when the gain is zero. Although this disclosure describes applying the adjustment midway between zero crossings 230, this disclosure contemplates applying the adjustment substantially midway between zero crossings 230 due to factors such as delay caused by circuit elements and/or noise, or any other suitable factor. Therefore, herein, reference to instants "midway" between zero crossings 230 may encompass instants substantially midway between zero crossings 230.

Figure 6:
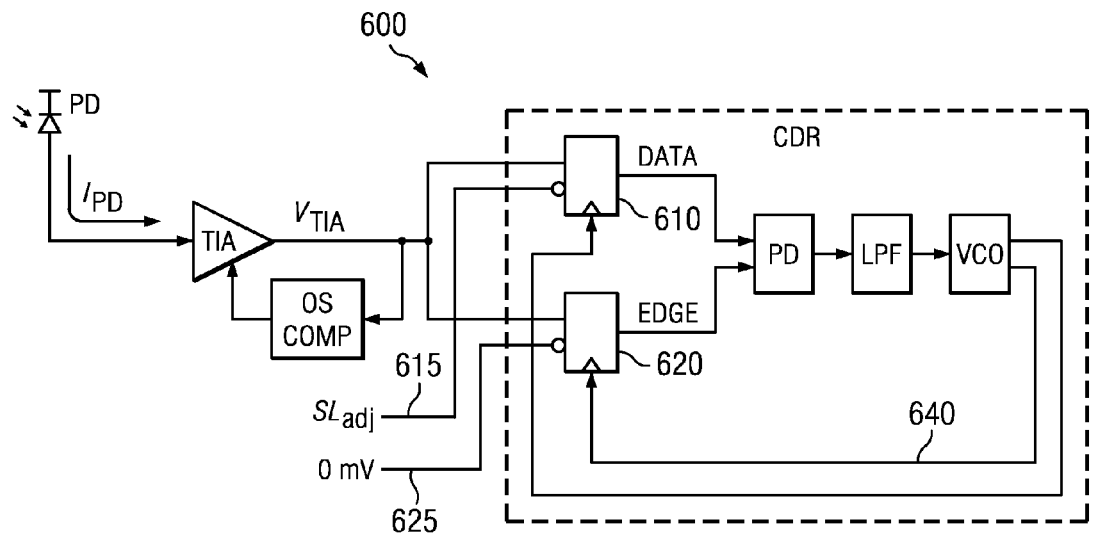
FIG. 6 is a schematic diagram of the receiver of FIG. 5.

FIG. 6 is a schematic diagram of the receiver 500 of FIG. 5. As provided in FIG. 6, the reference voltage 615 of the DATA decision circuit 610 that samples the signal 200 halfway between zero crossings 230 may be varied above and below zero in accordance with the required slice-level adjustment $SL_{adj}$. In particular embodiments, if the value of a sample produced by DATA decision circuit 610 is below the reference voltage 615, it may be determined to be a logic "0," and if the sample is above the reference voltage 615, it may be determined to be a logic "1." Conversely, the reference voltage 625 of the EDGE decision circuit 620 that samples the signal 200 at its zero crossings 230 may be independent from $SL_{adj}$ and may be left unchanged (for example, 0 mV). In particular embodiments, EDGE decision circuit 620 may sample the signal 200 according to a clock signal 640. The clock signal 640 may be set such that EDGE decision circuit 620 samples the signal 200 at its zero crossings 230.

In this manner, receiver 500 may sample a signal 200 at its zero crossings 230 and halfway between zero crossings 230, and may apply slice level adjustment only to the samples that occurred halfway between zero crossings 230. By applying slice-level adjustment to the DATA decision circuit 610, the timing of the signal's 200 zero crossings 230 may not be affected. The invention therefore presents a method by which slice-level adjustment may be given to a signal 200 such that it does not degrade a receiver's 100 overall performance. In particular embodiments, the samples produced by DATA decision circuit 610 and/or the samples produced by EDGE decision circuit 620 may be used later to extract a clock signal embedded in signal 200.

Although this disclosure describes sampling signal 200 when the value of signal 200 is a particular value, such as for example at zero crossings 230, this disclosure contemplates sampling signal 200 when the value of signal 200 is substantially the particular value due to factors such as delay caused by circuit elements and/or noise, or any other suitable factor. Although this disclosure describes sampling signal 200 at particular instants, such as for example halfway between zero crossings 230, this disclosure contemplates sampling signal 200 at instants substantially close to the particular instant, such as for example substantially halfway between zero crossings 230, due to factors such as delay caused by circuit elements and/or noise, or any other suitable factor.

In particular embodiments, the CDR that encompasses DATA decision circuit 610 and EDGE decision circuit 620 may be a "half-rate," "quarter-rate," or lower rate architecture. As an example and not by way of limitation, in the case of a quarter-rate architecture, EDGE decision circuit 620 may include four samplers. Each sampler may sample signal 200 in turn (the first sampler will sample signal 200 at the first zero crossing 230, the second sampler will sample signal 200 at the second zero crossing 230, the third sampler will sample signal 200 at the third zero crossing 230, the fourth sampler will sample signal 200 at the fourth zero crossing 230, the first sampler will sample signal 200 at the fifth zero crossing 230, and so on). Although this disclosure describes DATA and EDGE decision circuits for use within CDR architectures of particular rates, this disclosure contemplates DATA and EDGE decision circuits of CDR architectures of any suitable rates. In particular embodiments, the reference voltages of the DATA or EDGE decision circuit in a lower-rate CDR may be independent of each other.

Figure 7:
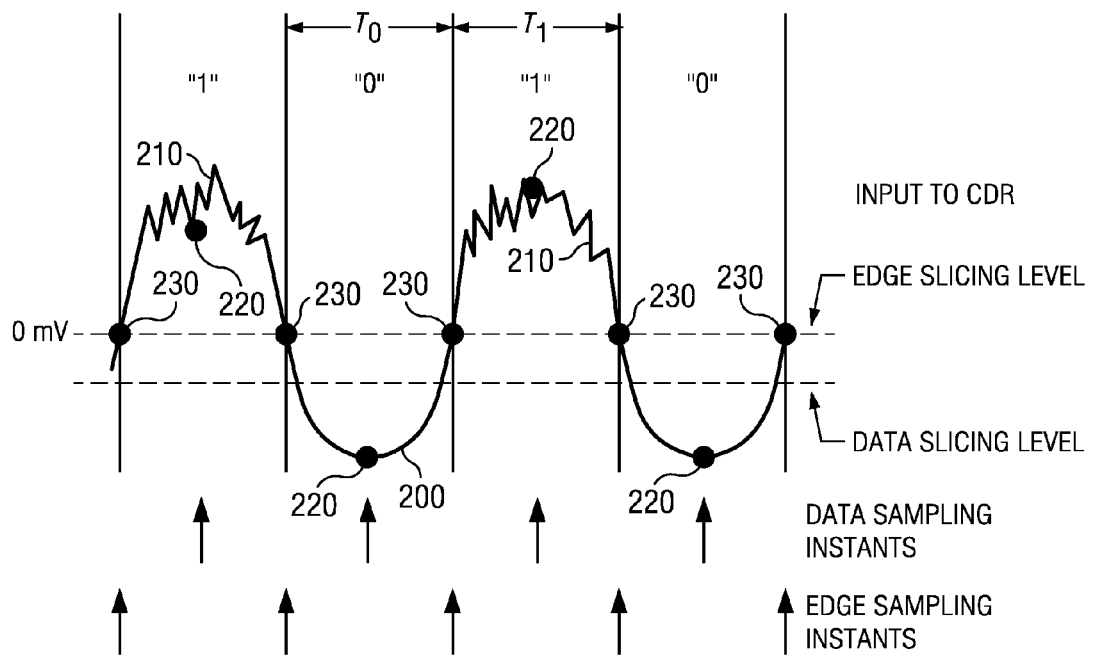
FIG. 7 illustrates an example signal with slice-level adjustment effected by the receiver of FIG. 5.

FIG. 7 illustrates an example signal with slice-level adjustment effected by the receiver 500 of FIG. 5. As provided in FIG. 7, applying slice-level adjustment at data-sampling instants and not continuously does not inject PWD into the signal—and therefore does not generate jitter in the CDR's data- and edge-sampling clocks. In particular embodiments, because T1=T0, the CDR may position its data-sampling clock with greater certainty halfway between the signal's 200 zero crossings 230. Moreover, in particular embodiments, the CDR may be a "half-rate" type (or lower rate), in which two (or more) DATA decision circuits and two (or more) EDGE decision circuits may be employed. In these embodiments, the same considerations for adjusting the DATA decision circuits' reference voltages apply as to the described embodiment of FIG. 6. In particular embodiments, the slice-level adjustment signal $SL_{adj}$ may be generated by an automatic feedback control, rather than supplied from an external source.

In particular embodiments, slice-level adjustment may be effected at sampling instants, that is, instants in time that are midway between the signal's 200 zero crossings 230. It is at these instants that the signal amplitude is maximized. By performing slice adjustment in this manner, and not continuously, the PWD introduced into the signal may be lowered, thereby resulting in less timing uncertainty and improved receiver performance. In particular embodiments, the mechanisms of offset-compensation and slice-level adjustment, which are independent phenomena, may be decoupled from one another.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
receiving a signal from a transmitter, wherein the signal comprises a plurality of zero crossings;
sampling the signal at least approximately at the zero crossings of the signal using at least a first reference voltage to produce a first plurality of sampled values;
sampling the signal at least approximately halfway between the zero crossings of the signal using at least a second reference voltage to produce a second plurality of sampled values without affecting the zero crossings, wherein the first and second reference voltages are set independently of each other;
continuously adjusting the second reference voltage based at least in part on a noise distribution between a first amplitude of the signal corresponding to a logic 0 and a second amplitude of the signal corresponding to a logic 1; and
continuously canceling an offset voltage present in the signal using the first plurality of sampled values and the second plurality of sampled values without affecting the zero crossings.

2. The method of claim 1, wherein the second reference voltage is set using feedback control.

3. The method of claim 1, further comprising extracting a clock signal embedded in the signal using at least the second plurality of sampled values.

4. The method of claim 1, wherein the amplitude of the signal is maximized when the signal is sampled using the second reference voltage at least approximately halfway between the zero crossings of the signal.

5. The method of claim 1, wherein:
the signal is sampled at least approximately at the zero crossings of the signal by N sub-samplers;
N is a positive, non-zero integer; and
the sub-samplers sequentially sample the signal at 1/N of a frequency of a clock signal embedded within the signal.

6. The method of claim 5, wherein reference voltages of the sub-samplers are set independent of each other.

7. The method of claim 1, wherein:
the signal is sampled at least approximately at the zero crossings of the signal by further using a first clock timing; and
the signal is sampled at least approximately halfway between the zero crossings of the signal by further using a second clock timing, wherein each of the first and second clock timings is determined at least in part by the first and second pluralities of sampled values.

8. A circuit configured to:
receive a signal from a transmitter, wherein the signal comprises a plurality of zero crossings;
sample the signal at least approximately at the zero crossings of the signal using at least a first reference voltage to produce a first plurality of sampled values;
sample the signal at least approximately halfway between the zero crossings of the signal using at least a second reference voltage that is set independent of the first reference voltage to produce a second plurality of sampled values without affecting the zero crossings, wherein the first and second reference voltages are set independently of each other;
continuously adjust the second reference voltage based at least in part on a noise distribution between a first amplitude of the signal corresponding to a logic 0 and a second amplitude of the signal corresponding to a logic 1; and
continuously cancel an offset voltage present in the signal using the first plurality of sampled values and the second plurality of sampled values without affecting the zero crossings.

9. The circuit of claim 8, wherein the second reference voltage is set using feedback control.

10. The circuit of claim 8, further configured to extract a clock signal embedded in the signal using at least the second plurality of sampled values.

11. The circuit of claim 8, wherein the amplitude of the signal is maximized when the signal is sampled at least approximately halfway between the zero crossings of the signal.

12. The circuit of claim 8, wherein:
the signal is sampled at least approximately at the zero crossings of the signal by N sub-samplers;
N is a positive, non-zero integer; and
the sub-samplers sequentially sample the signal at 1/N of a frequency of a clock signal embedded within the signal.

13. The circuit of claim 12, wherein reference voltages of the sub-samplers are set independent of each other.

14. The circuit of claim 8, wherein:
the signal is sampled at least approximately at the zero crossings of the signal by further using a first clock timing; and
the signal is sampled at least approximately halfway between the zero crossings of the signal by further using a second clock timing, wherein each of the first and second clock timings is determined at least in part by the first and second pluralities of sampled values.

15. A system comprising:
means for sampling a signal received from a transmitter, wherein:
the signal comprises a plurality of zero crossings; and
the signal is sampled at least approximately at the zero crossings of the signal using at least a first reference voltage to produce a first plurality of sampled values;
means for sampling the signal at least approximately halfway between the zero crossings of the signal using at least a second reference voltage to produce a second plurality of sampled values without affecting the zero crossings, wherein the first and second reference voltages are set independently of each other;
means for continuously adjusting the second reference voltage based at least in part on a noise distribution between a first amplitude of the signal corresponding to a logic 0 and a second amplitude of the signal corresponding to a logic 1; and means for continuously canceling an offset voltage present in the signal using the first plurality of sampled values and the second plurality of sampled values without affecting the zero crossings.

16. The system of claim 15, wherein the second reference voltage is set using feedback control.

17. The system of claim 15, further comprising means for extracting a clock signal embedded in the signal using at least the second plurality of sampled values.

18. The system of claim 15, wherein the amplitude of the signal is maximized when the signal is sampled at least approximately halfway between the zero crossings of the signal.

19. The system of claim 15, wherein:
the signal is sampled at least approximately at the zero crossings of the signal by N sub-samplers;
N is a positive, non-zero integer; and
the sub-samplers sequentially sample the signal at 1/N of a frequency of a clock signal embedded within the signal.

20. The system of claim 19, wherein reference voltages of the sub-samplers are set independent of each other.

21. The system of claim 15, wherein:
the signal is sampled at least approximately at the zero crossings of the signal by further using a first clock timing; and
the signal is sampled at least approximately halfway between the zero crossings of the signal by further using a second clock timing, wherein each of the first and second clock timings is determined at least in part by the first and second pluralities of sampled values.

\* \* \* \* \*